US009725870B2

(12) United States Patent
Liu et al.

(10) Patent No.: US 9,725,870 B2
(45) Date of Patent: Aug. 8, 2017

(54) APPARATUS AND METHOD OF USING A DISCONNECTABLE FLOATING SPAR BUOY JACKET WIND TURBINE

(71) Applicant: SOFEC, Inc., Houston, TX (US)

(72) Inventors: Yonghui Liu, Houston, TX (US);
Cheng-Pen Kwei, Houston, TX (US);
Ding Yu, Houston, TX (US); Takuju Nakamura, Tokyo (JP); Hao Yu, Katy, TX (US); Seth Tharpe, Houston, TX (US); David Seaman, Waller, TX (US)

(73) Assignee: Sofec, Inc., Houston, TX (US)

( * ) Notice: Subject to any disclaimer, the term of this patent is extended or adjusted under 35 U.S.C. 154(b) by 0 days.

(21) Appl. No.: 14/963,930

(22) Filed: Dec. 9, 2015

(65) Prior Publication Data

US 2016/0160836 A1    Jun. 9, 2016

Related U.S. Application Data

(60) Provisional application No. 62/089,625, filed on Dec. 9, 2014, provisional application No. 62/109,736, filed
(Continued)

(51) Int. Cl.
  *E02D 27/52*     (2006.01)
  *B63B 22/04*     (2006.01)
  (Continued)

(52) U.S. Cl.
  CPC ............. *E02D 27/52* (2013.01); *B63B 22/04* (2013.01); *B63B 35/003* (2013.01); *B63B 35/44* (2013.01);
  (Continued)

(58) Field of Classification Search
  CPC .......... F03D 11/04; F03D 11/045; F03D 9/00; F03D 1/00; F03D 1/001; F03D 1/005;
  (Continued)

(56) References Cited

U.S. PATENT DOCUMENTS 4,854,779 A * 8/1989 Luyties ................. E02B 17/027
                                                    405/204
5,803,668 A * 9/1998 Seki ....................... E02B 17/021
                                                    405/204
(Continued)

OTHER PUBLICATIONS

PCT Search Report and Written Opinion (PCT/US2015/064766), dated Feb. 9, 2016.

*Primary Examiner* — Lars A Olson
(74) *Attorney, Agent, or Firm* — Bracewell LLP; Douglas W. Rommelmann (57) ABSTRACT

Disclosed embodiments relate to systems and methods for mating a wind turbine off-shore to a spar buoy without the use of a crane barge. The system may include a spar buoy, wherein the spar buoy is secured to a foundation, and a wind turbine to be installed on the spar buoy. The system may also include a first truss affixed to the top of the spar buoy and a second truss affixed to the bottom of the wind turbine. The first truss may comprise either stabbings or receptacles configured for mating to the second truss and the second truss may comprise either receptacles or stabbings configured for mating to the first truss.

17 Claims, 8 Drawing Sheets

Related U.S. Application Data on Jan. 30, 2015, provisional application No. 62/119,673, filed on Feb. 23, 2015.

(51) Int. Cl.
| | |
|---|---|
| *F03D 1/00* | (2006.01) |
| *F03D 13/25* | (2016.01) |
| *B63B 35/00* | (2006.01) |
| *F03D 13/40* | (2016.01) |
| *B63B 35/44* | (2006.01) |
| *B63B 9/06* | (2006.01) |

(52) U.S. Cl.
CPC ............. *F03D 13/25* (2016.05); *F03D 13/40* (2016.05); *B63B 2009/067* (2013.01); *B63B 2035/442* (2013.01); *B63B 2035/446* (2013.01); *F05B 2230/604* (2013.01); *F05B 2240/93* (2013.01); *F05B 2240/95* (2013.01); *F05B 2260/02* (2013.01); *Y02E 10/727* (2013.01); *Y02P 70/523* (2015.11)

(58) Field of Classification Search
CPC B63H 1/38; B63B 21/00; B63B 22/04; E02B 17/02; E02B 21/00
USPC ............. 114/121; 405/204, 205; 416/84, 85; 441/21
See application file for complete search history.

(56) References Cited

U.S. PATENT DOCUMENTS

| | | | |
|---|---|---|---|
| 6,968,797 B2* | 11/2005 | Persson | .................. B63B 9/065 405/205 |
| 8,118,538 B2 | 2/2012 | Pao | |
| 8,192,160 B2* | 6/2012 | Garcia Lopez | ......... F03D 13/25 416/85 |
| 8,197,208 B2 | 6/2012 | Sharples et al. | |
| 8,235,629 B2 | 8/2012 | Jakubowski | |
| 2005/0206168 A1 | 9/2005 | Murakami et al. | |
| 2008/0240864 A1 | 10/2008 | Belinsky | |
| 2013/0224020 A1 | 8/2013 | Dagher et al. | |

* cited by examiner

APPARATUS AND METHOD OF USING A DISCONNECTABLE FLOATING SPAR BUOY JACKET WIND TURBINE

CROSS REFERENCE TO RELATED APPLICATIONS

This application claims the benefit of U.S. Provisional Application Ser. No. 62/089,625 filed Dec. 9, 2014. Applicant incorporates by reference herein Application Ser. No. 62/089,625 in its entirety.

This application claims the benefit of U.S. Provisional Application Ser. No. 62/109,736 filed Jan. 30, 2015. Applicant incorporates by reference herein Application Ser. No. 62/109,736 in its entirety.

This application claims the benefit of U.S. Provisional Application Ser. No. 62/119,673 filed Feb. 23, 2015. Applicant incorporates by reference herein Application Ser. No. 62/119,673 in its entirety.

FIELD

Embodiments relate generally to floating platforms, such as spar buoys, and structures, such as wind turbines, that can be installed and uninstalled offshore using a truss or other mating device. In some embodiments of the invention, the system can be retrieved for relocation. In some embodiments, the system can be easily installed and/or uninstalled without using a crane barge.

BACKGROUND AND SUMMARY

Connecting and disconnecting offshore structures, such as wind turbines, frequently requires the use of a crane barge. Embodiments described below allow these structures to be assembled offshore without a crane barge. Embodiments disclosed may assist with assembly or serve as a mating device. The ability to install and/or uninstall wind turbines to a floating platform, such as a spar buoy, without a crane barge may save significant amounts of time and money for the operator.

DESCRIPTION OF THE INVENTION

Figure 1:
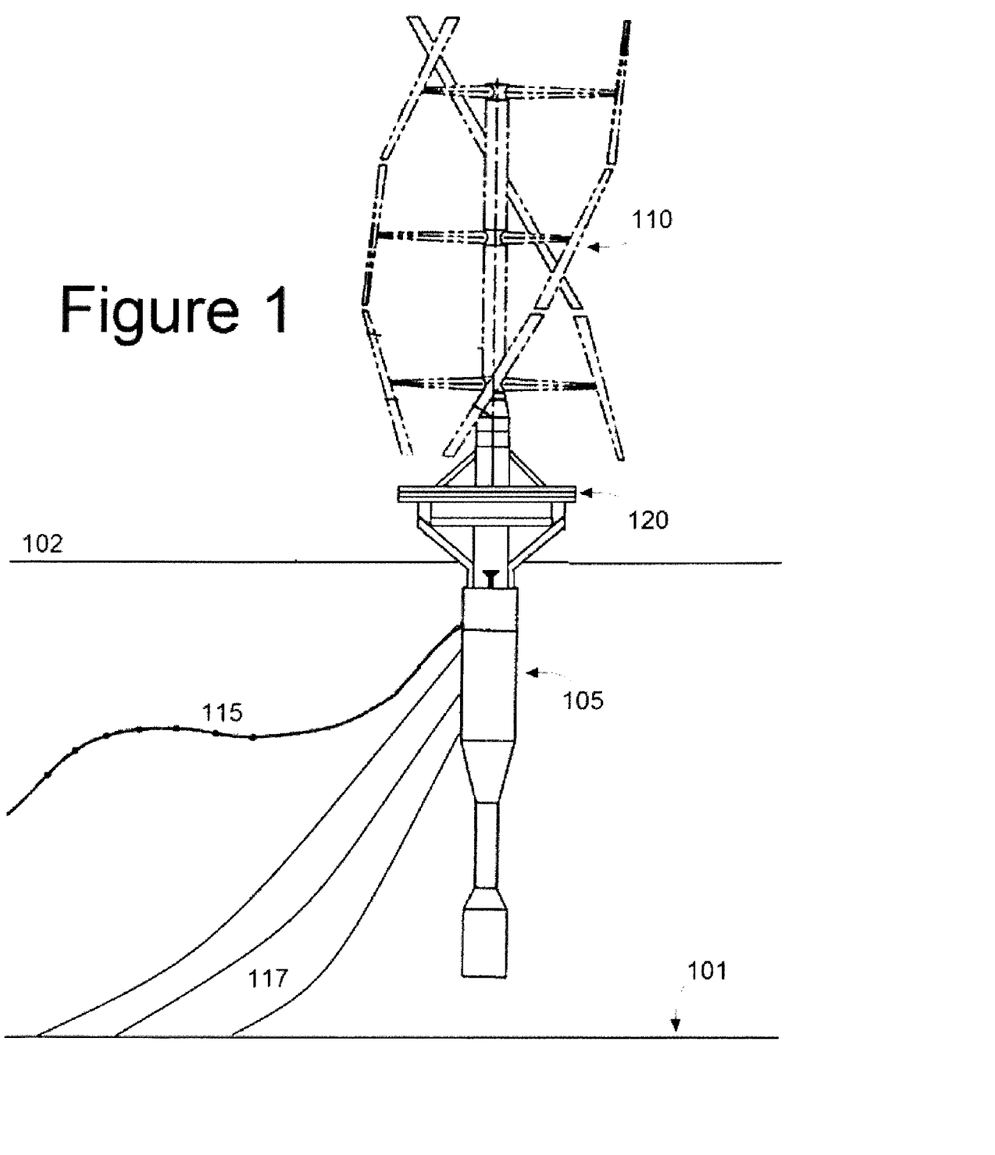
FIG. 1 is a side view of a disconnectable floating spar buoy and wind turbine connected by a connected truss.

A disconnectable floating spar buoy 105 and wind turbine 110 are presented in FIG. 1. The structure can be easily installed and uninstalled offshore without using a crane barge. In this particular embodiment, a truss structure 120, or jacket, is inserted between the wind turbine 110 and spar buoy 105 as a part of the whole system, and utilized as the mating device. Flexible cables and/or umbilicals 115 can be utilized between the foundation 101 and wind turbine 110 to transfer power and control signals.

Figure 2:
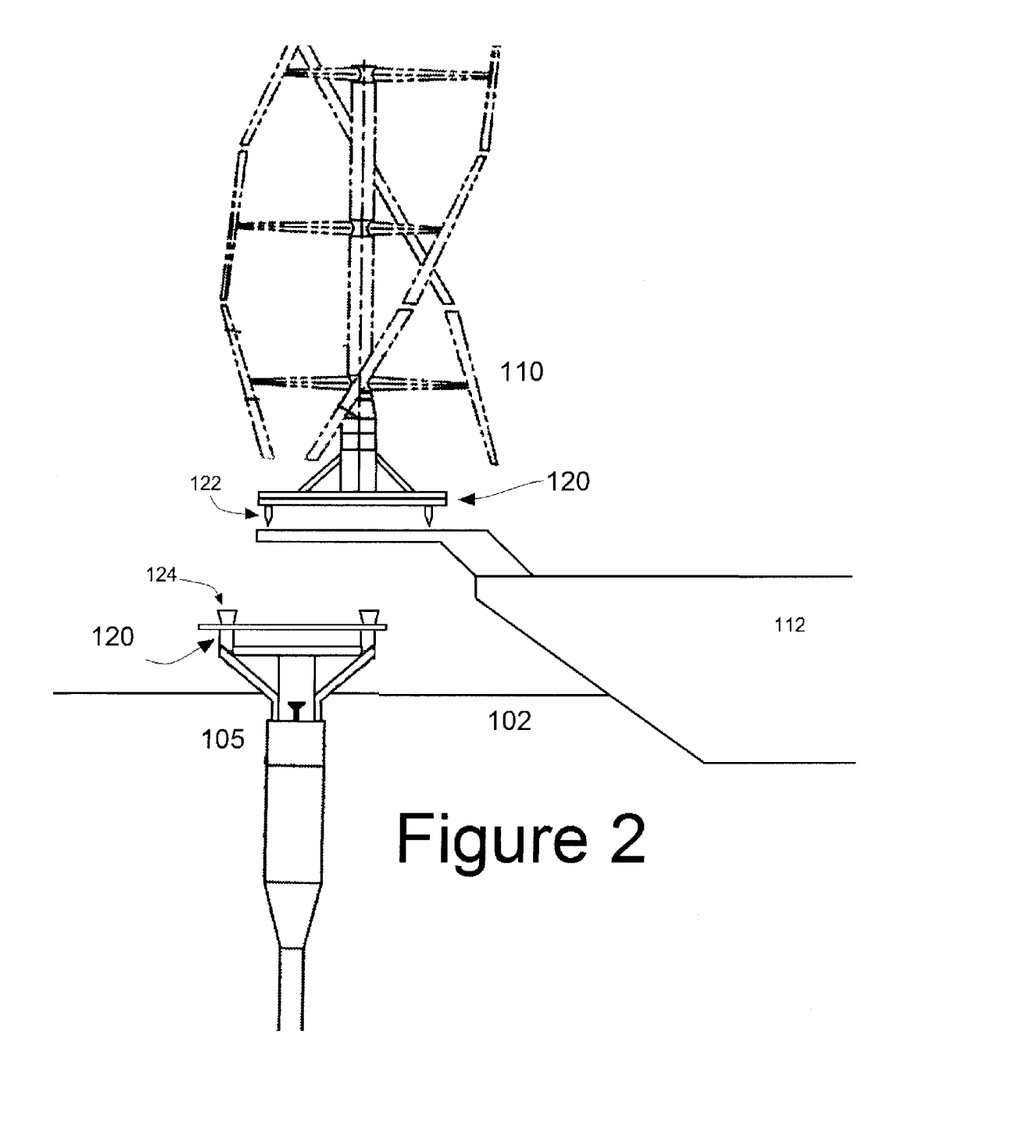
FIG. 2 is a side view of the system showing the wind turbine before it is installed onto the spar buoy.
Figure 3:
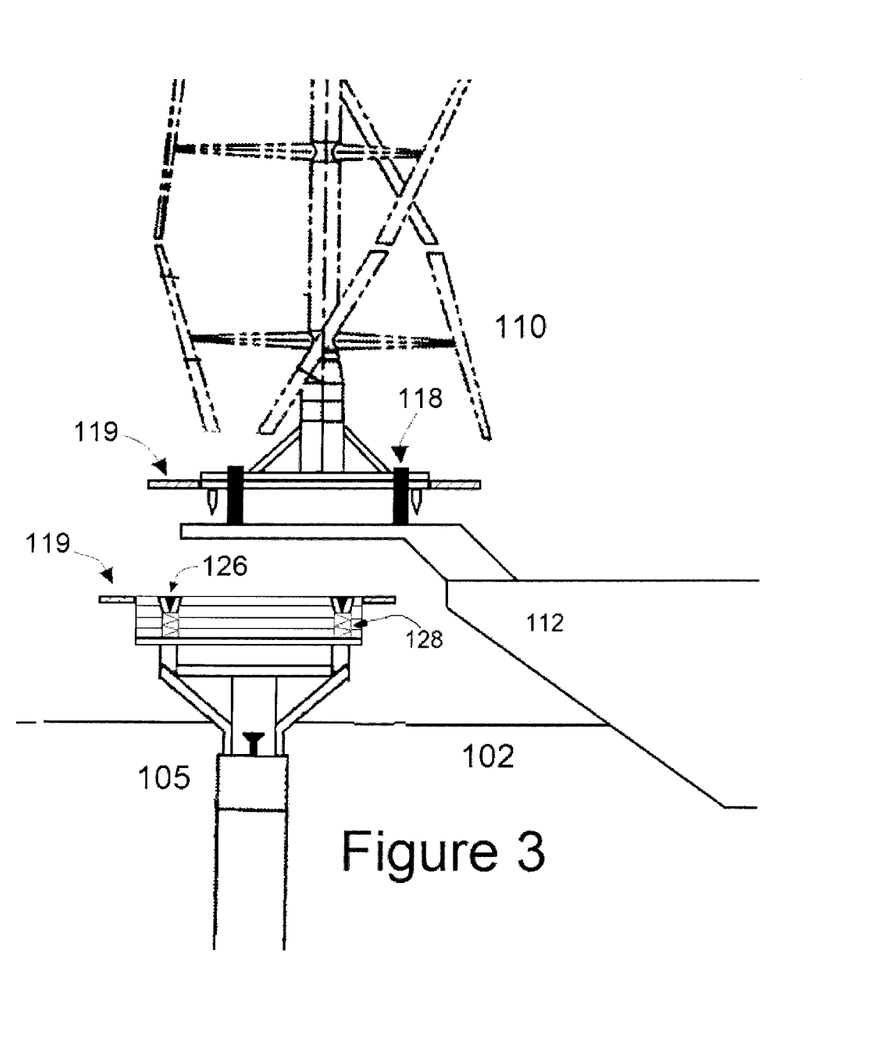
FIG. 3 is a side view of the system showing more details of the truss mating components.
Figure 4:
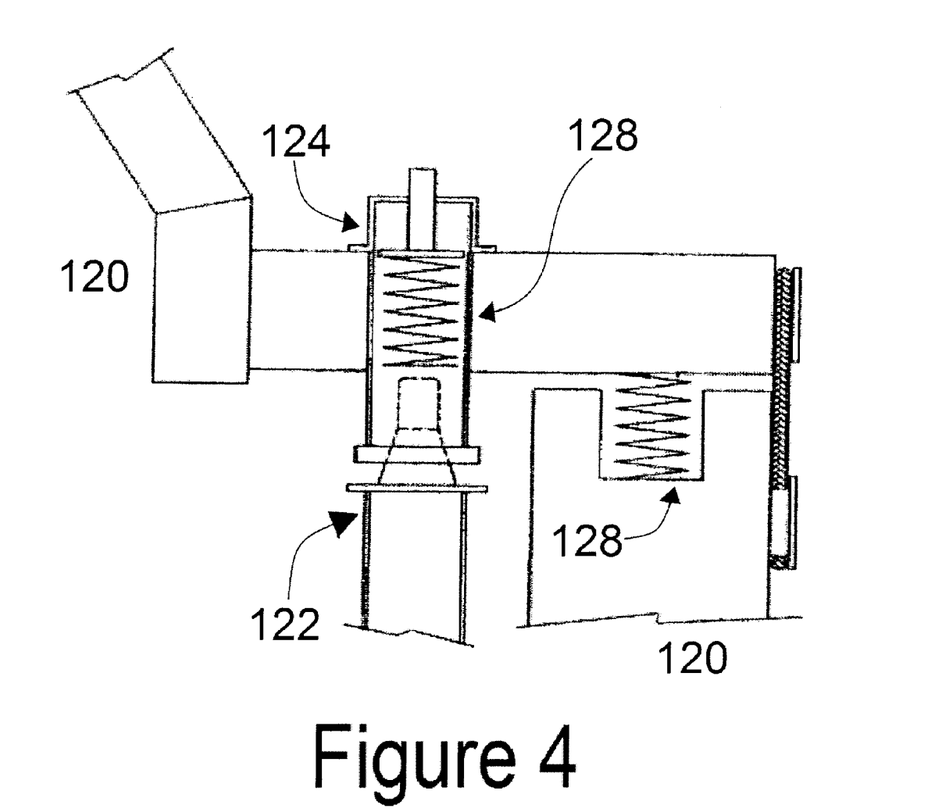
FIG. 4 is a partial section view a potential mating concept arrangement.
Figure 5:
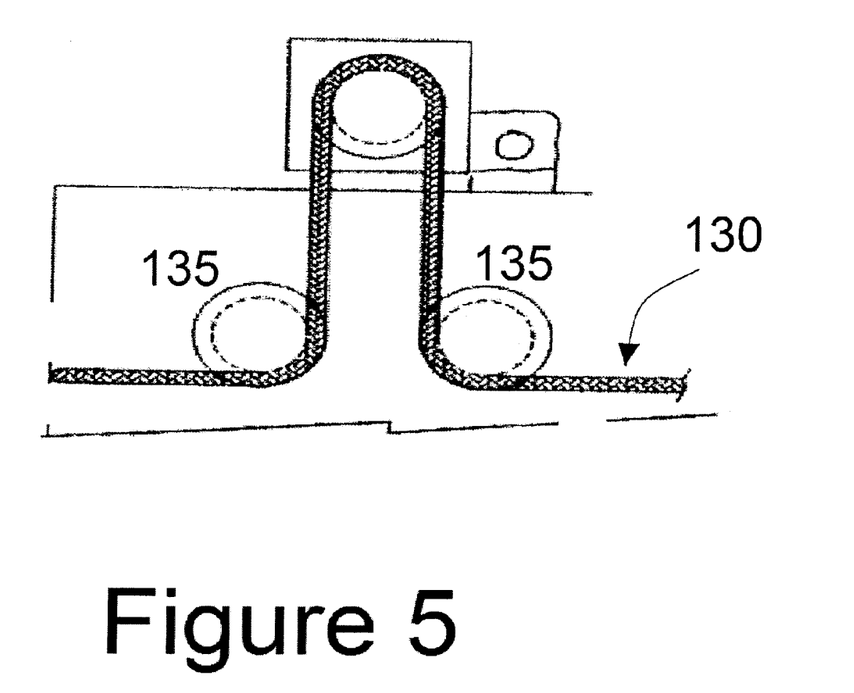
FIG. 5 is a partial section view of an alternative mating embodiment.

One possible method of installation and uninstallation may be applied as follows:

1. A truss device 120 with stabbings 122 or receptacles 124 may be attached to the bottom of a wind turbine 110.
2. A truss device 120 with receptacles 124 or stabbings 122 may be attached to the top of a spar buoy 105 or other floating body such that the top of the floating body is above the water line 102 and contains the mate, either stabbings 122 or receptacle 124, to the truss attached to the bottom of the wind turbine 110.
3. Rubber fenders or shock absorbers 126 may be attached to the receptacles. A bolted flange 119 may be preinstalled to either stabbings 122 or receptacles 124 for the purposes of connecting and disconnecting.
4. The spar buoy 105 with the truss 120 may be installed and secured with a mooring system 117 at a site.
5. The wind turbine 110 with the truss 120 may transported to the spar buoy site by a vessel 112. The wind turbine 110 may be secured on the vessel 112 by a sea fastening device 118.
6. The wind turbine 110 may be positioned at the top of the spar buoy 105 and lowered to a predetermined height above the top of the spar buoy 105 by ballasting the vessel 112 downward and deballasting the spar buoy 105 upward.
7. The stabbings 122 may be aligned with the receptacles 124 and the vessel 112 may be ballasted downward and the spar buoy 105 may be deballasted upward until the stabbings 122 are inside the receptacles 124.
8. The sea fastening devices 118 may be removed to allow the turbine 110 to be unrestrained from the vertical upward motion but limited to other motions.
9. The spar buoy 105 may keep deballasting upward until all the weight of the wind turbine 110 is transferred to the spar buoy 105 and has left the vessel 112, while maintaining the stable spar draft.
10. The spar buoy 105 may keep deballasting upward and the vessel 112 may keep ballasting downward until the vessel 112 is separated from the wind turbine 110.
11. The stabbings 122 may be welded to the receptacles 124, which may complete the mating process. Alternatively, the flanges may be bolted together, securing the spay buoy 105 and wind turbine 110 together.
12. For disconnection, the bolted flanges may be unbolted and the installation procedures may be reversed to uninstall the wind turbine 110 from the spar buoy 105 or other floating structure.

Additionally, a floating structure which may be used with wind turbines 110 or other large devices is presented. The wind turbine 110 may be easily installed and/or uninstalled offshore without using a crane barge. A truss structure 120 may be inserted between the wind turbine 110 and floating structure or buoy 105 as a part of the whole system and utilized as the mating device.

The truss structure 120 may be installed on the lower portion of a wind turbine 110, or the upper portion of a floating platform or both. The truss structure 120 then facilitates mating of the wind turbine 110 or other device to the floating support structure or spar buoy 105. Flexible cables or umbilicals 115 can be utilized between the foundation and wind turbine 110 to transfer power and control signals.

One embodiment is a floating platform with a truss structure 120 installed at the upper portion. This embodiment may be anchored at sea in order to facilitate later installation of a wind turbine 110 or other device equipped with an appropriate mating truss 120. The floating platform may be slender bodied and significantly taller than it is wide.

Another potential embodiment allows fork-on/fork-off installation and removal of a wind turbine 110 or other large device from a floating platform or spar buoy 105 when both the device and platform are pre-equipped with appropriate mating trusses 120.

In some embodiments, truss structures 120 are installed between the wind turbine 110 and spar buoy 105 to form a complete system for an easy offshore mating operation. A bolted flange 119 can be preinstalled to the stabbings 122 and/or receptacles 124 to allow for disconnection as discussed above.

Truss structures 120 may also be utilized as mating assistant tools only, and removed after completion of the mating operation using conventional flange 119 to flange 119 bolting between the wind turbine 110 and the spar buoy 105 or other floating body. For disconnection, the truss structure 120 can be reattached to the wind turbine 110 and spar buoy 105 as the disconnection tools and the installation procedures are reversed.

Figure 8:
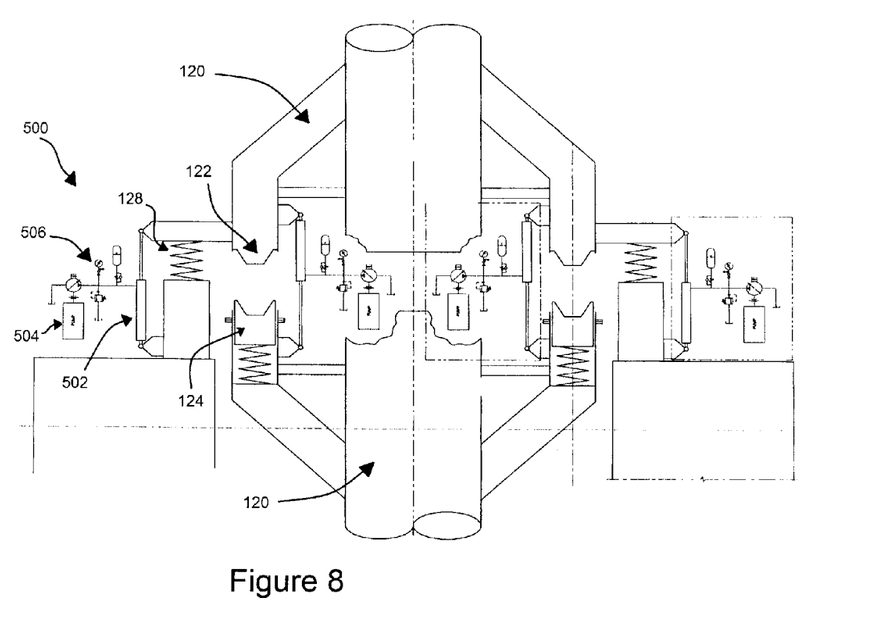
FIG. 8 shows an arrangement of the Shock Absorbing Locking Device (SALD).

During the mating operation, a Shock Absorbing Locking Device (SALD) 500 may be used. The SALD 500 provides positive locking engagement between the respective dynamic interfaces while still allowing for energy absorption of large dynamic loading resulting from attempted separation between the respective bodies. As shown in FIG. 8, each SALD 500 includes a hydraulic cylinder 502 which connects the wind turbine 110 to the spar buoy 105 when retracted and may be extended to allow for disconnection of the wind turbine 110 from the spar buoy 105. The cylinder may be extended or retracted using a hydraulic pump 504 to allow for disconnection and connection of the SALD 500 to the wind turbine 110 and/or spar buoy 105. A first end of the hydraulic cylinder 502 may be attached to either the wind turbine 110 or spar buoy 105 using any appropriate attachment. The second end of the hydraulic cylinder 502 may be attached to the structure to be mated, either the spar buoy 105 or wind turbine 110, using a similar attachment as the first end or by a fitting that only attaches as the hydraulic cylinder 502 is retracted. This style of fitting could provide for faster connection and disconnection as opposed to a bolt on attachment of both ends of the hydraulic cylinder 502. The SALD 500 may include a hydraulic accumulator 506 which has a dampening effect on the dynamic load when the SALD 500 is activated. In a preferred embodiment, two sets of SALDs 500 may be used at each stabbing 122 and receptacle 124 point in order to ensure greater stability and more robust mating between the wind turbine 110 and spar buoy 105. Each SALD 500 may be arranged very similarly, but the first end of the first SALD hydraulic cylinder 502 may be connected to the wind turbine 110 and the first end of the second SALD hydraulic cylinder 502 may be connected to the spar buoy 105. Additionally SALDs 500 may be used to stabilize and/or attach a wind turbine 110 to a vessel 112 for transport. For example:
  a. Vessel SALD 500: provides positive locking engagement with dynamic load dampening effects between the vessel 112 and wind turbine 110.
  b. Spar SALD 500: provides positive locking engagement with dynamic load dampening effects between the wind turbine 110 and the spar buoy 105.

The SALD 500 has three modes of operation:
  A. Disconnected: The SALD 500 is not connected between the respective dynamic interfaces. No positive locking or dampening of dynamic loading is available. The dynamic bodies (i.e., wind turbine 110, spar buoy 105, vessel 112, etc.) are free to separate.
  B. Connected: The SALD 500 is connected between the respective dynamic interfaces using hydraulic cylinder 502; however, the cylinder 502 is not fully retracted and dynamic loading is not applied to the SALD system. The dynamic bodies are flexibly locked together to prevent wind turbine 110 capsizing.
  C. Activated: The SALD 500 is connected between the respective dynamic interfaces. The hydraulic cylinder 502 is fully retracted and dynamic loading is applied to the SALD 500 system. The dynamic bodies are rigidly locked together preventing excessive movement or separation between the respective bodies.

The following provides a general description of the mating process:
  1) A truss structure 120 with stabbings 122 or receptacles 124 may be attached to the bottom of a wind turbine 110.
  2) A truss structure 120 with opposing receptacles 124 or stabbings 122 may be attached to the top of a spar buoy 105.
  3) Spar damping springs 128 may be attached to the receptacles 124. A bolted flange 119 may be preinstalled to either stabbings 122 or receptacles 124 to allow for disconnection.
  4) The spar truss 120 may be installed and secured with a mooring system 117 at a site.
  5) Vessel damping springs 128 may be placed between the bottom of the wind turbine truss 120 and installation/transportation vessel 112. Both spar and vessel damping springs 128 may be designed to absorb impact energy between wind turbine truss 120 and spar truss 120 during the mating operation. Lateral stops may also be installed between wind turbine truss 120 and vessel 112 to prevent wind turbine truss 120 from sliding during installation.
  6) Positive locks may be provided between wind turbine 110 truss 120 and transportation vessel 112 during transit to site (i.e. sea fastening).
  7) Vessel SALD 500 may be connected to prevent wind turbine 110 capsizing during the mating operation. The system may be inactive during transportation until the positive locks are removed prior to the mating operation.
  8) The wind turbine truss 120 may be transported to the spar buoy 105 site and lowered to a predetermined height above the top of the spar truss 120 by ballasting the vessel 112 downward and deballasting the spar buoy 105 with spar truss 120 upward.
  9) The positive locks between the wind turbine truss 120 and vessel 112 may be removed and the vessel SALD 500 activated.
  10) The stabbings 122 may be aligned with the receptacles 124 and the vessel 112 may be ballasted downward. The spar truss 120 may be deballasted upward until the stabbings 122 are inside the receptacles 124. During this operation, both vessel 112 and spar 105 damping springs 128 will absorb impact energy between wind turbine truss 120 and spar truss 120. The vessel SALD 500 may remain active to prevent the wind turbine 110 from capsizing.
  11) The spar SALD 500 may be connected between spar truss 120 and wind turbine truss 120. The wind turbine truss 120 may be engaged to the spar truss 120 with the spar SALD 500 remaining in the connected position to allow the spar 105 dampening springs 128 to remain flexible. The engaged spar SALD 500 may be able to withstand the potential uplift loading from capsizing of the wind turbine truss 120.

12) The spar buoy 105 may continue deballasting upward until all the weight of the wind turbine truss 120 is transferred to the spar truss 120 and the wind turbine 110 separates from the vessel 112, while maintaining the stable spar 105 draft.

13) The vessel SALD 500 may be deactivated and kept connected.

14) The spar SALD 500 may be activated, fully compressing the spar dampening springs 128 to form a rigid connection.

15) The vessel SALD 500 may be disconnected.

16) The spar truss 120 may continue to be deballasted upward and/or the vessel 112 may be ballasted downward and/or the lateral stops may be simultaneously lowered to free the lateral stops from the wind turbine truss 120. The vessel 112 may be removed from the wind turbine truss 120.

17) The mating process may be completed by welding or flange bolting the stabbings 122 and receptacles 124 between wind turbine truss 120 and spar truss 120.

18) For disconnection of the wind turbine 110 from the spar truss 120, the bolted flanges 119 may be unbolted and the installation procedures may be reversed.

In a potential alternate embodiment for the SALD 500, the vessel dampeners 128 and spar dampeners 128 act in similar fashion, however the means to couple the structures together to prevent uplift differs. Instead of using a hydraulic cylinder 502, a rope 130 may be fitted around trunnions 135 to secure the structures together. The rope 130 may be tensioned using a constant tension winch or similar device. The benefit with this arrangement is the securing force is effectively doubled as two parts of rope secure each load application point. Plus, one winch may be used for multiple load points with only minor loss in capacity due to frictional effects. A similar arrangement could be used between the spar and wind turbine trusses 120 as a spar SALD 500 with a prearranged rope 130.

Figure 6:
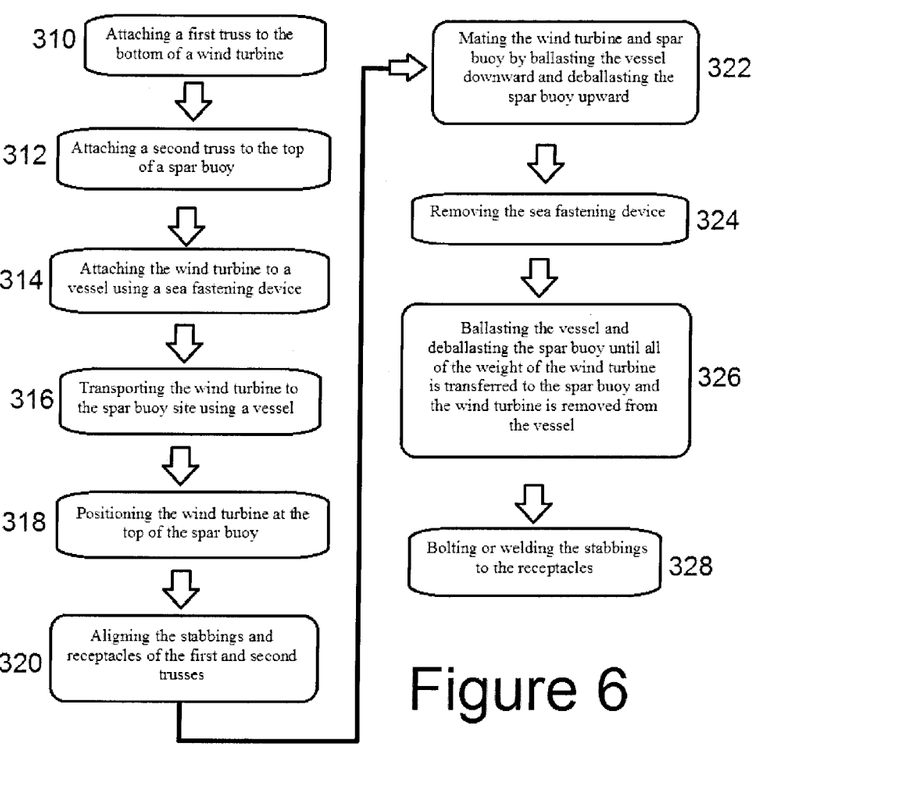
FIG. 6 shows one possible method of mating a wind turbine to a spar buoy.

With reference now to FIG. 6, shown is a flow diagram illustrating an embodiment of a method of installing a wind turbine to a spar buoy while off shore without the use of a crane barge. The method may include attaching a first truss to the bottom of a wind turbine, block 310, attaching a second truss to the top of a spar buoy, block 312, and attaching the wind turbine to a vessel using a sea fastening device, block 314. The method may also include transporting the wind turbine to the spar buoy site using a vessel, block 316, positioning the wind turbine at the top of the spar buoy, block 318, aligning the stabbings and receptacles, block 320, and mating the wind turbine and spar buoy by ballasting the vessel downward and deballasting the spar buoy upward until the stabbings are inside the receptacles, block 322. This method may additionally include removing the sea fastening device, block 324, ballasting the vessel and deballasting the spar buoy until all of the weight of the wind turbine is transferred to the spar buoy and the wind turbine is removed from the vessel, block 326, and welding the stabbings to the receptacles, block 328.

Figure 7:
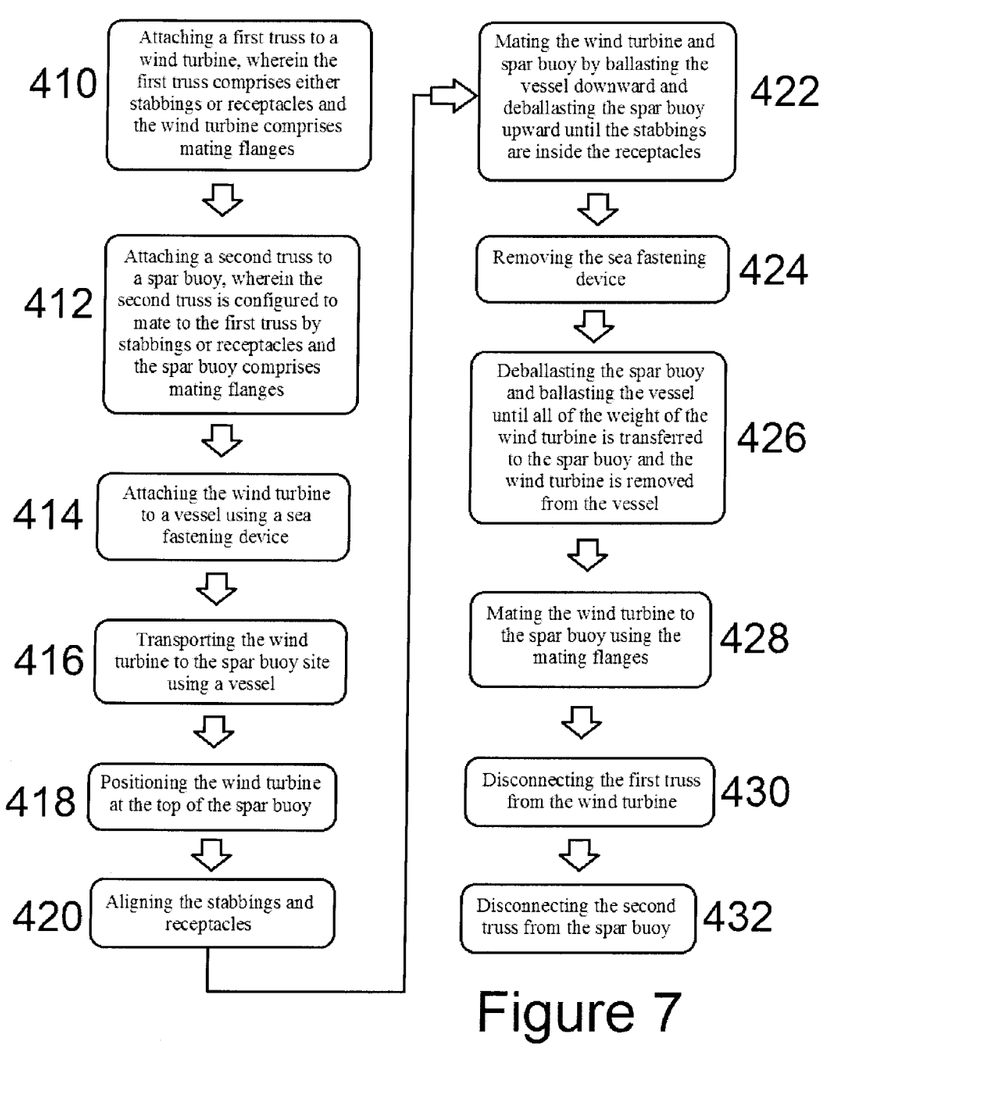
FIG. 7 shows an alternative method of mating a wind turbine to a spar buoy.

With reference now to FIG. 7, shown is a flow diagram illustrating an alternative embodiment of a method of installing a wind turbine to a spar buoy while off shore without the use of a crane barge. This method may include attaching a first truss to a wind turbine, wherein the first truss comprises either stabbings or receptacles and the wind turbine comprises mating flanges, block 410, and attaching a second truss to a spar buoy, wherein the second truss is configured to mate to the first truss by stabbings or receptacles and the spar buoy comprises mating flanges, block 412. The method may also include attaching the wind turbine to a vessel using a sea fastening device, block 414, transporting the wind turbine to the spar buoy site using a vessel, block 416, positioning the wind turbine at the top of the spar buoy, block 418, and aligning the stabbings and receptacles, block 420. The method may additionally include mating the wind turbine and spar buoy by ballasting the vessel downward and deballasting the spar buoy upward until the stabbings are inside the receptacles, block 422, removing the sea fastening device, block 424, deballasting the spar buoy and ballasting the vessel until all of the weight of the wind turbine is transferred to the spar buoy and the wind turbine is removed from the vessel, block 426, mating the wind turbine to the spar buoy using the mating flanges, block 428, disconnecting the first truss from the wind turbine, block 430, and disconnecting the second truss from the spar buoy, block 432.

Disclosed embodiments relate to a system for mating a wind turbine 110 off shore to a spar buoy 105 without the use of a crane barge. The system may include a spar buoy 105, wherein the spar buoy 105 is secured to a foundation 101, and a wind turbine 110 to be installed on the spar buoy 105. The system may also include a first truss 120 affixed to the top of the spar buoy 105 and a second truss 120 affixed to the bottom of the wind turbine 110. The first truss 120 may comprise either stabbings 122 or receptacles 124 configured for mating to the second truss 120 and the second truss 120 may comprise either receptacles 124 or stabbings 122 configured for mating to the first truss 120.

Disclosed embodiments may also include shock absorbers 126. In some embodiments, the shock absorbers may be damping springs 128.

In some disclosed embodiments, the system may also include umbilicals 115 configured to provide power and control signals.

In still more disclosed embodiments, the spar buoy 105 may be secured to a foundation 101 using a mooring system 117.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method of installing a wind turbine to a spar buoy while offshore without the use of a crane barge, the method comprising the steps of:
attaching a first truss to the bottom of the wind turbine, wherein the first truss comprises either stabbings or receptacles;
attaching a second truss to the top of the spar buoy wherein the second truss is configured to mate to the first truss by stabbings or receptacles;
transporting the wind turbine to the spar buoy site using a vessel;
positioning the wind turbine at the top of the spar buoy;
aligning the stabbings and receptacles;

mating the wind turbine and spar buoy by ballasting the vessel downward and deballasting the spar buoy upward until the stabbings are inside the receptacles; and ballasting the vessel and deballasting the spar buoy until all of the weight of the wind turbine is transferred to the spar buoy and the wind turbine is removed from the vessel.

2. The method of claim 1, wherein shock absorbers are attached to the receptacles.

3. The method of claim 1, further comprising the step of welding the stabbings to the receptacles.

4. The method of claim 1, further comprising the steps of attaching the wind turbine to a vessel using a sea fastening device and later removing the sea fastening device.

5. The method of claim 1, further comprising the step of bolting the stabbings to the receptacles.

6. The method of claim 2, wherein the shock absorbers are damping springs.

7. The method of claim 1, further comprising the steps of connecting a shock absorbing locking device to the wind turbine, activating the shock absorbing locking device, deactivating the shock absorbing locking device, and disconnecting the shock absorbing locking device.

8. A method of installing a wind turbine to a spar buoy while offshore without the use of a crane barge, the method comprising the steps of:
    attaching a first truss to the wind turbine, wherein the wind turbine comprises at least one mating flange;
    attaching a second truss to the spar buoy, wherein the spar buoy comprises at least one mating flange;
    wherein one of the trusses includes a plurality of stabbings and the other truss includes a plurality of receptacles;
    transporting the wind turbine to the spar buoy site using a vessel;
    positioning the wind turbine at the top of the spar buoy;
    aligning the plurality of stabbings with the plurality of receptacles;
    mating the wind turbine and spar buoy by ballasting the vessel downward and deballasting the spar buoy upward until the plurality of stabbings are inside the plurality of receptacles;
    deballasting the spar buoy and ballasting the vessel until all of the weight of the wind turbine is transferred to the spar buoy and the wind turbine is removed from the vessel;
    securing the wind turbine to the spar buoy using the mating flanges;
    disconnecting the first truss from the wind turbine; and
    disconnecting the second truss from the spar buoy.

9. The method of claim 8, wherein shock absorbers are attached to the receptacles.

10. The method of claim 8, further comprising the steps of attaching the wind turbine to a vessel using a sea fastening device and later removing the sea fastening device.

11. The method of claim 8, further comprising the steps of connecting a shock absorbing locking device to the wind turbine, activating the shock absorbing locking device, deactivating the shock absorbing locking device, and disconnecting the shock absorbing locking device.

12. A system for mating a wind turbine offshore to a spar buoy without the use of a crane barge, the system comprising:
    a spar buoy secured to a foundation;
    a wind turbine to be installed on the spar buoy;
    a first mating structure affixed to the top of the spar buoy;
    a second mating structure affixed to the bottom of the wind turbine;
    a plurality of stabbings on one of the mating structures;
    a plurality of receptacles on the other mating structure, wherein the stabbings are configured for mating with the receptacles, and
    a plurality of damping springs attached to at least one of the mating structures.

13. A system for mating a wind turbine offshore to a spar buoy without the use of a crane barge, the system comprising:
    a spar buoy secured to a foundation;
    a wind turbine to be installed on the spar buoy;
    a first mating structure affixed to the top of the spar buoy;
    a second mating structure affixed to the bottom of the wind turbine;
    a plurality of stabbings on one of the mating structures;
    a plurality of receptacles on the other mating structure, wherein the stabbings are configured for mating with the receptacles, and
    umbilicals configured to provide power and control signals.

14. The system of claim 13, wherein the spar buoy is secured to a foundation using a mooring system.

15. A system for mating a wind turbine offshore to a spar buoy without the use of a crane barge, the system comprising:
    a spar buoy secured to a foundation;
    a wind turbine to be installed on the spar buoy;
    a first mating structure affixed to the top of the spar buoy;
    a second mating structure affixed to the bottom of the wind turbine;
    a plurality of stabbings on one of the mating structures;
    a plurality of receptacles on the other mating structure, wherein the stabbings are configured for mating with the receptacles, and
    at least one shock absorbing locking device.

16. The system of claim 15, wherein the at least one shock absorbing locking device comprises an hydraulic cylinder, an hydraulic pump, and an hydraulic accumulator.

17. A system for installing a wind turbine offshore to an in-situ floating platform without the use of a crane, the floating platform secured to a foundation by a mooring system, the system for installing comprising:
    a first mating structure affixed to the top of the floating platform; and
    a wind turbine having a second mating structure affixed to the bottom of the wind turbine,
    wherein one of the mating structures includes a plurality of stabbings and the other mating structure includes a plurality of receptacles, the plurality of stabbings arranged and designed to mate with the plurality of receptacles;
    a vessel for transporting the wind turbine to the location of the floating platform, the vessel including a vessel ballast system; and
    the floating platform having a platform ballast system,
    wherein when the vessel has positioned the wind turbine above the floating platform, one or both of the ballast systems are employed to engage the plurality of stabbings with the aligned plurality of receptacles.

* * * * *